United States Patent [19]

Hellwig et al.

[11] 4,355,390
[45] Oct. 19, 1982

[54] METHOD FOR CHECKING DATA WRITTEN INTO BUFFERED WRITE-READ MEMORIES IN NUMERICALLY CONTROLLED MACHINE TOOLS

[75] Inventors: Friedrich-Wilhelm Hellwig, Hemhofen; Werner Schrei, Kleinsendelbach, both of Fed. Rep. of Germany

[73] Assignee: Siemens Aktiengesellschaft, Munich, Fed. Rep. of Germany

[21] Appl. No.: 189,110

[22] Filed: Sep. 22, 1980

[30] Foreign Application Priority Data

Sep. 28, 1979 [DE] Fed. Rep. of Germany ....... 2939461

[51] Int. Cl.³ ............................................. G06F 11/10
[52] U.S. Cl. ......................................... 371/21; 371/53
[58] Field of Search ...................... 371/21, 53; 364/474

[56] References Cited

U.S. PATENT DOCUMENTS 3,838,264  9/1974  Maker ................................... 371/21
4,142,243  2/1979  Bishop et al. .......................... 371/53

OTHER PUBLICATIONS

I. S. Glickstein, Weighted Checksum to Detect and Restore Altered Bits in Computer Memory, IBM Tech. Discl. Bulletin, vol. 13, No. 10, Mar. 1971, pp. 3146–3147.
R. K. Richards, Arithmetic Operations in Digital Computers, D. Van Nostrand Co., Inc., 1955, pp. 190–191.

Primary Examiner—Charles E. Atkinson
Attorney, Agent, or Firm—Kenyon & Kenyon

[57]  ABSTRACT

A method for checking stored data in numerically controlled machine tools with buffered write-read memories is disclosed. The longitudinal sums of associated data are formed in individual write-read memories and are written into a supplementary buffer memory. When the system is switched-on or at periodic intervals, the longitudinal sums of the data are formed and compared with the stored longitudinal sums. In the event of deviations, the affected data block is indicated.

2 Claims, 1 Drawing Figure

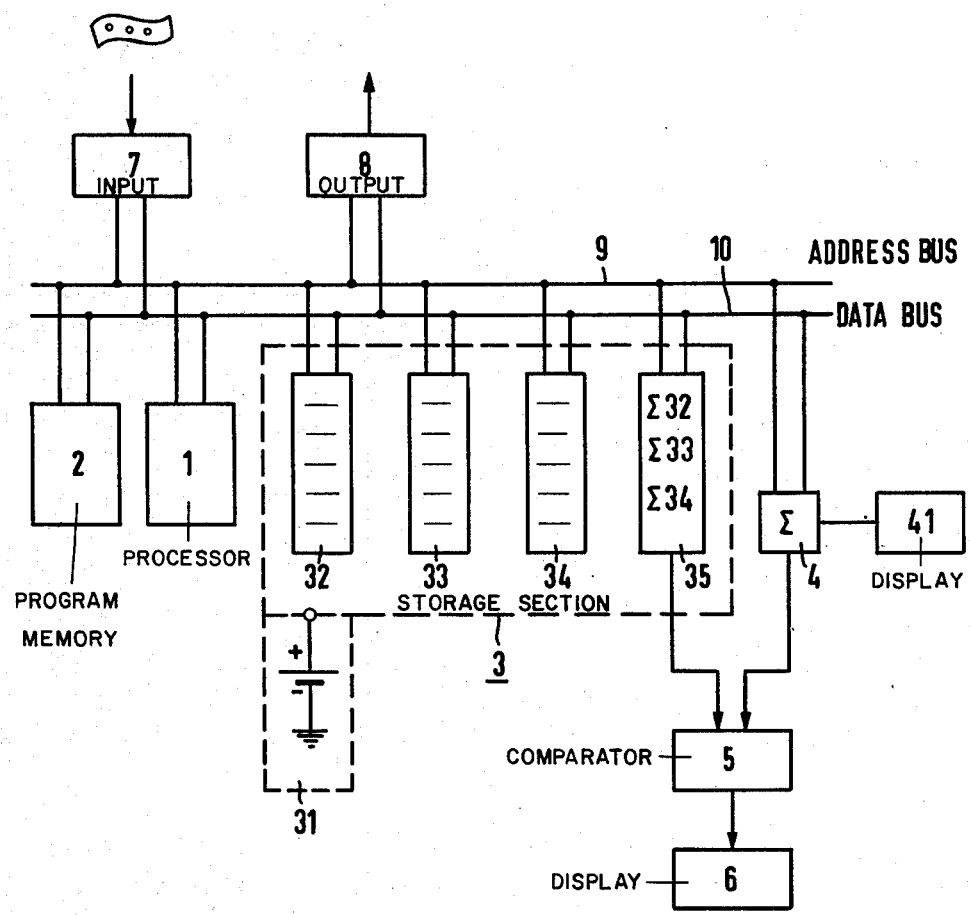

METHOD FOR CHECKING DATA WRITTEN INTO BUFFERED WRITE-READ MEMORIES IN NUMERICALLY CONTROLLED MACHINE TOOLS

BACKGROUND OF THE INVENTION

The present invention relates to a method for checking data written into buffered write-read memories in numerically controlled machine tools.

In modern automation systems, for instance, in the control of machine tools, the microprocessor has largely replaced hard-wired logic (see, for instance, Siemens-Zeitschrift 1977, No. 8).

Logic operations executed by the system according to a system program are usually permanently programmed in semiconductor memories. In addition to system program memories, storage locations for variable data are further provided in the computer control. Such variable data is entered by operating personnel or by a data carrier and may comprise the entire workpiece program or subprogram routines, and also tool and tool correction data and machine related data. This data is retained by buffer memories during a defined system off-period. Incorrect information in those memories, for instance, because a bit of a semiconductor memory was incorrectly cleared when the system was switched on, or because of a poor soldering joint or a defective plug connection not making contact, can lead to a failure of the entire automation system. In the case of a fault, it is also very difficult for service personnel to localize the affected semiconductor area.

OBJECT AND SUMMARY OF THE INVENTION

It is an object of the present invention to provide a method for checking stored data which is simple and reliable.

According to the invention, longitudinal sums of associated data or data blocks are written into a supplementary buffer memory; the longitudinal sum of associated data or a respective data block is formed each time there is a change in data and the sum is entered into the supplementary memory; the longitudinal sum of the respective data, when data is scanned by the control from the write-read memory, is compared with the corresponding longitudinal sum in the supplementary memory; and the affected data is indicated in the event of deviations.

In this manner, upon switching the system on, as well as during operation of the system at appropriate or periodic times, the data content of associated data can be checked.

These and other aspects of the present invention will be more apparent from the following description of the preferred embodiment taken in conjunction with the accompanying drawing and appended claims.

BRIEF DESCRIPTION OF THE DRAWING

The present invention is illustrated by way of example and not limitation in the sole FIGURE of the accompanying drawing which is a block diagram illustrating a system in which the method according to the invention is carried out.

DESCRIPTION OF THE PREFERRED EMBODIMENT

Referring more particularly to the drawing, a computer control for machine tools comprises a processor 1 which operates in accordance with the system program stored in the system program memory 2.

In addition, a storage section, area or region 3, framed by dashed lines, is provided which comprises buffered write-read memories 32, 33, 34 and 35. A buffer battery 31 is connected to the storage section 3 and enables it to retain its state for an extended period of time. Data traffic between individual units represented by an input 7 and an output 8 is transmitted via a data bus 10, the individual elements being respectively selected by the signal present on the address bus 9. Numerical controls of this kind are known and are described in detail, for instance, in the aforementioned Siemens-Zeitschrift.

In the buffered storage section 3, the memory portion 32 receives the workpiece program; further, the memory portion 33 contains tool data and tool correction data, and the memory portion 34 contains machine data. When data is entered into those memories, whether by perforated tape or via a keyboard, the longitudinal sum of the respective memories 32 to 34 is formed in a summing device 4. This value, indicated on the display 41, is then provided to the address of the respective memory in the supplementary memory 35. In this manner, corresponding longitudinal sums are available as control values in the memory 35, after the memories 32 to 34 are filled.

Upon switching the system on, the summing device 4 is activated and determines the longitudinal sums of the memories. The resulting sums are compared with the values in the supplementary memory 35 by means of a comparator 5. If there is no deviation, the system program of the automation system is started. If, however, there is a deviation, the affected data area is indicated on a display 6. Such control is performed advantageously not only upon switching the system on, but also at predetermined times when scanning data from the memories 32 to 34.

In order that the information in the supplementary memory 35 is always in its most recent state, the longitudinal sums of the respective data blocks in the individual memories 32 to 34 are formed each time there is a change of data in the data blocks, whether through addition, alteration or clearing, and are written into the control memory 35.

The advantages of the present invention, as well as certain changes and modifications of the disclosed embodiments thereof, will be readily apparent to those skilled in the art. It is the applicants' intention to cover by their claims all those changes and modifications which could be made to the embodiments of the invention herein chosen for the purpose of the disclosure without departing from the spirit and scope of the invention.

What is claimed is:

1. A method for checking data written into a buffered write-read memory in a control apparatus for a numerically controlled machine tool, comprising supplying buffered power to the write-read memory independently of the power supplied to the control apparatus so as to enable the write-read memory to store data for an extended period of time, forming longitudinal sums of associated data each time there is a change in the associated data, writing the longitudinal sums into the buffered write-read memory, reforming the longitudinal sums each time power is supplied to the control apparatus, comparing the formed and reformed longitudinal sums, and indicating the affected data if there is a deviation.

2. The method according to claim 1 and including the steps of reforming the longitudinal sums periodically, comparing the formed and periodically reformed sums and indicating the affected data if there is a deviation.

* * * * *